US011182517B2

(12) United States Patent
Lopez et al.

(10) Patent No.: US 11,182,517 B2
(45) Date of Patent: Nov. 23, 2021

(54) MODIFICATION DATA FOR ADDITIVE MANUFACTURING

(71) Applicant: Hewlett-Packard Development Company, L.P., Houston, TX (US)

(72) Inventors: Miguel Angel Lopez, Sant Cugat del Valles (ES); Salvador Sanchez Ribes, Sant Cugat del Valles (ES); Luis Garcia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 555 days.

(21) Appl. No.: 16/080,969

(22) PCT Filed: Mar. 18, 2016

(86) PCT No.: PCT/EP2016/055924
§ 371 (c)(1),
(2) Date: Aug. 29, 2018

(87) PCT Pub. No.: WO2017/157455
PCT Pub. Date: Sep. 21, 2017

(65) Prior Publication Data
US 2019/0095555 A1 Mar. 28, 2019

(51) Int. Cl.
*G06F 30/20* (2020.01)
*B29C 64/386* (2017.01)
(Continued)

(52) U.S. Cl.
CPC ............ *G06F 30/20* (2020.01); *B29C 64/135* (2017.08); *B29C 64/386* (2017.08);
(Continued)

(58) Field of Classification Search
CPC .......... G06F 30/00; G06F 30/20; G06F 30/17; G06F 2119/08; G06F 2119/18;
(Continued)

(56) References Cited

U.S. PATENT DOCUMENTS 5,059,359 A * 10/1991 Hull et al. .............. B29C 35/08
264/22
10,759,117 B2 * 9/2020 Herzog et al. ........ B29C 64/386
(Continued)

FOREIGN PATENT DOCUMENTS

WO    WO-2015108546    7/2015

OTHER PUBLICATIONS

Nicholas P Lavery, Stephen G. R. Brown, Johann Sienz, John Cherry; A review of Computational Modelling of Additive Layer Manufacturing—multi-scale and multi-physics ; Sustainable Design and Manufacturing; pp. 668-690 (Year: 2014).*

(Continued)

*Primary Examiner* — Rehana Perveen
*Assistant Examiner* — Nupur Debnath
(74) *Attorney, Agent, or Firm* — HP Inc. Patent Department

(57) ABSTRACT

In an example, a method includes analysing, using at least one processor, object model data representing at least a portion of an object to be generated by an additive manufacturing apparatus by fusing a build material to determine at least one predicted object generation temperature. The method may further include identifying, using at least one processor and from said analysing, a feature of the at least a portion of the object associated with a predicted object generation temperature which is below a fusing temperature of build material to be used in object generation. The method may further include determining, using at least one processor, modification data to be used in object generation, the modification data being to increase a temperature of the feature in object generation.

12 Claims, 5 Drawing Sheets

(51) Int. Cl.
*B29C 64/135* (2017.01)
*B33Y 50/00* (2015.01)
*G06F 30/17* (2020.01)
*B29C 64/393* (2017.01)
*G06F 119/18* (2020.01)
*B22F 10/30* (2021.01)
*B33Y 50/02* (2015.01)
*G06F 30/00* (2020.01)
*G06F 119/08* (2020.01)
*B22F 10/20* (2021.01)

(52) U.S. Cl.
CPC ............ *B29C 64/393* (2017.08); *B33Y 50/00* (2014.12); *G06F 30/00* (2020.01); *G06F 30/17* (2020.01); *B22F 10/20* (2021.01); *B22F 10/30* (2021.01); *B33Y 50/02* (2014.12); *G06F 2119/08* (2020.01); *G06F 2119/18* (2020.01); *Y02P 10/25* (2015.11); *Y02P 90/02* (2015.11)

(58) Field of Classification Search
CPC .......... B22F 10/00; B22F 10/10; B33Y 50/00; B33Y 50/02; B29C 64/135; B29C 64/386; B29C 64/393; Y02P 10/25; Y02P 90/02
See application file for complete search history.

(56) References Cited

U.S. PATENT DOCUMENTS

| | | | |
|---|---|---|---|
| 10,807,305 B2* | 10/2020 | Zhao et al. | B33Y 50/00 |
| 2011/0087350 A1 | 4/2011 | Fogel et al. | |
| 2011/0178621 A1* | 7/2011 | Heide | G06T 11/20 |
| | | | 700/98 |
| 2014/0336807 A1 | 11/2014 | Smith et al. | |
| 2015/0269282 A1* | 9/2015 | Nelaturi et al. | G06F 17/50 |
| 2017/0056970 A1* | 3/2017 | Chin et al. | B22D 23/003 |

OTHER PUBLICATIONS

Ibiye Aseibichin Roberts; Investigation of Residual Stresses in the Laser Melting of Metal Powders in Additive Layer Manufacturing; Thesis paper (Year: 2012).*
International Search Report and Written Opinion for International Publication No. PCT/EP2016/055924 dated Dec. 21, 2016, 16 pages.
Hornus, et al., "Tight printable enclosures for additive manufacturing", May 4, 2015 (May 4, 2015), pp. 1-22, XP055328134, Domaine de Voluceau—Rocquencourt—France Ret.
Luo, et al., The Development of an Intelligent Web Based Rapid . . . , IEEE Transactions on Automation Science and Engineering, Jul. 2004, pp. 4-13. vol. 1 No. 1, IEEE.
Branner, et al., Coupled-Field Simulation in Additive Layer Manufacturing, 3rd International Conference PMI,, Sep. 17, 2008, pp. 184-193, XP00919089.

* cited by examiner

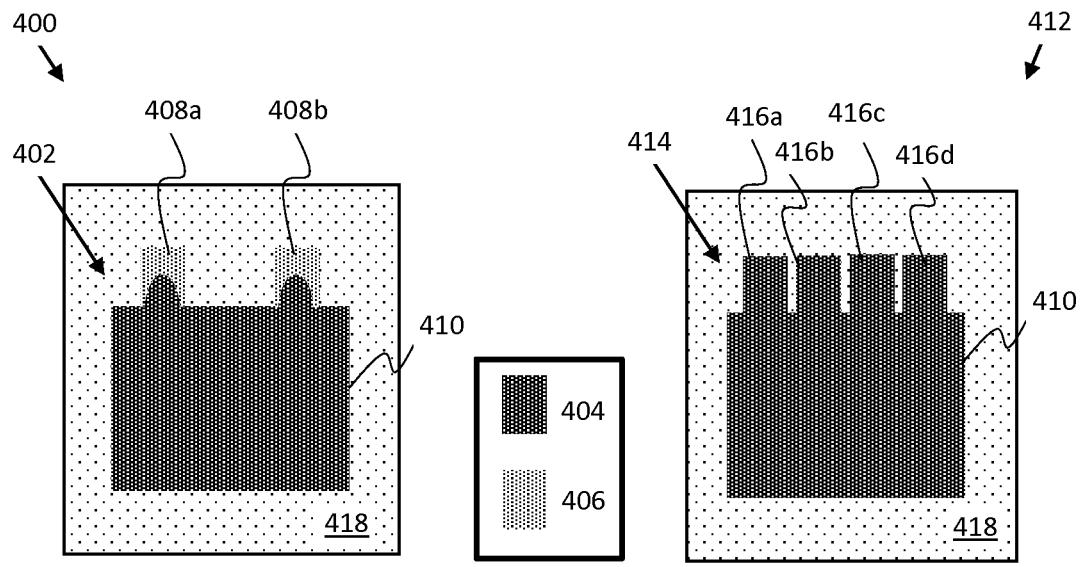
Fig. 4a
Fig. 4b
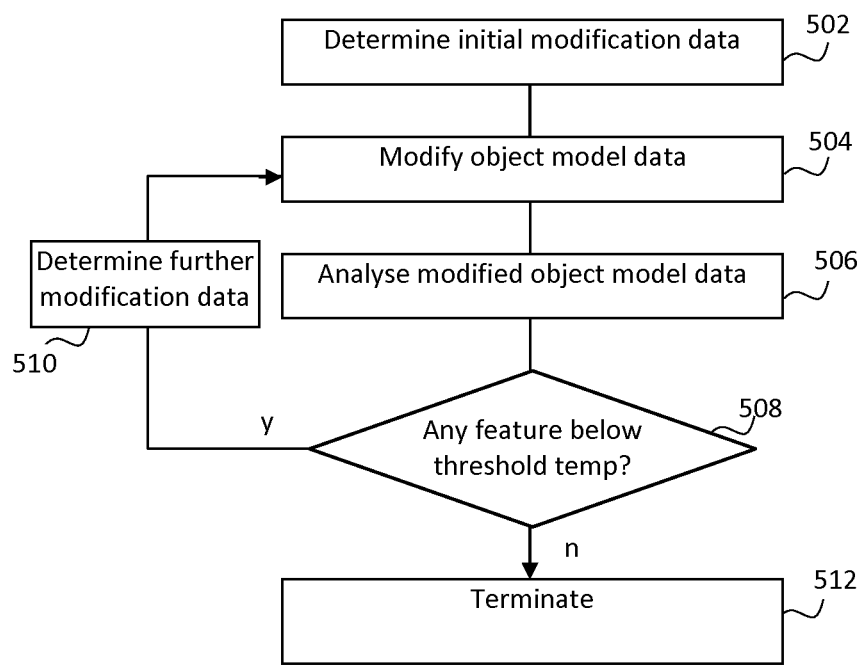
Fig. 5

MODIFICATION DATA FOR ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method includes heating the layers of build material to cause melting in selected regions. In other techniques, chemical solidification methods may be used.

BRIEF DESCRIPTION OF DRAWINGS

Non-limiting examples will now be described with reference to the accompanying drawings, in which:

FIGS. 4a and 4b are examples of heat maps;

FIG. 5 is a flowchart of another example method of determining modification data for additive manufacturing;

DETAILED DESCRIPTION

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

Figure 1:
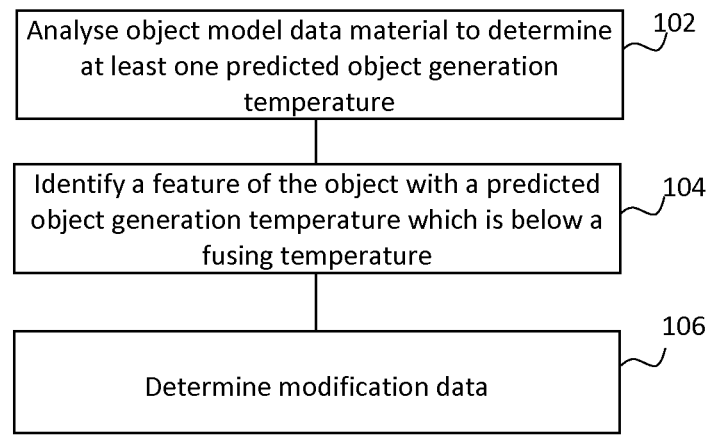
FIG. 1 is a flowchart of an example method of determining modifying data for additive manufacturing.

FIG. 1 is an example of a method comprising, in block 102, analysing, using at least one processor, object model data. The object model data represents at least a portion of an object to be generated by an additive manufacturing apparatus by fusing a build material and the analysing is to determine at least one predicted object generation temperature. In some examples, an object portion may comprise a layer of an object, for example a layer to be formed in a layer-by-layer manufacturing process such as additive manufacturing. The object model data may for example comprise a Computer Aided Design (CAD) model, and/or may for example be a STereoLithographic (STL) data file. As further set out below, the temperatures achieved in object generation may be associated with the solid volume of object features, and also the proximity of object features to other object features. In addition, the temperature achieved may be affected by at least one print agent applied to the build material.

Block 104 comprises identifying, using at least one processor and from said analysing, a feature of the object or object portion associated with a predicted object generation temperature which is below a fusing temperature of build material to be used in object generation. The fusing temperature may be a temperature at which build material is at least substantially entirely caused to melt such that it will coalesce and fuse to form a solid portion of the object. If a temperature reached in an attempt to generate a feature of the object is below the fusing temperature, then the feature may not be generated, or may partially—but not fully—fuse, which may in turn result in, for example, a misshapen and/or weakened feature in the formed object. The feature may be any object region, and in some examples is a projecting portion of the object (for example, a portion of the object which protrudes from a bulk portion), or an isolated feature.

Block 106 comprising determining, using at least one processor, modification data to be used in object generation, the modification data being to increase a temperature of the feature in object generation. For example, the modification data may be such that, when an object is generated using the modification data, the temperature of the feature will be (or is predicted to be) at least the fusing temperature. As further set out below, in some examples, the modification data is to cause modification of at least one of a material distribution within the object to be generated and an energy absorption characteristic of the object in object generation.

In some additive manufacture techniques, object data may comprise features of variable size. Certain features may be relatively small, or relatively small within a layer. There may be a minimum feature size which can be generated by an apparatus, for example a finite resolution in relation to the accuracy with which build material and/or print agents may be placed. Some techniques allow for accurate placement of print agent on a build material, for example by using print heads operated according to inkjet principles of two dimensional printing to apply print agents, which in some examples may be controlled to apply print agents with a resolution of around 600 dpi. This theoretically means that features as small as 42 microns could be generated. However, as noted above, energy is applied (for example using heat lamps) to cause the build materials to fuse, and such small areas of agent-treated build material may not absorb enough energy to reach the fusing temperature of the build material. Thus, in practise, in some examples, the minimum printable feature size may be determined not by the resolution of the object generation apparatus but by the temperature that such a feature can reach during the fusing process.

Figure 2:
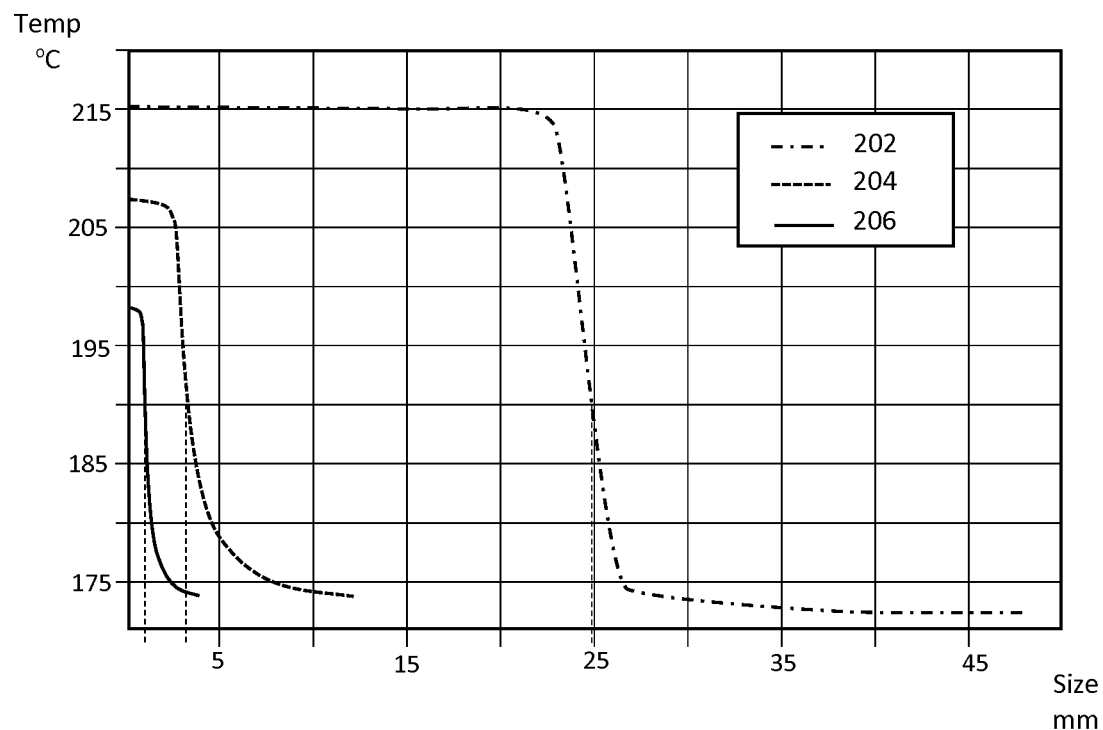
FIG. 2 is a graph showing examples of temperature in relation to feature size.

FIG. 2 is a graph showing how different feature sizes heat during object generation. For the sake of example, three different squares are considered, each generated by applying a fusing agent to a layer of build material at a predetermined area coverage (for example, x drops per cm$^2$). A first square, associated with line 202, is 25 mm in length. A second square, associated with line 204, is 3 mm in length and a third square, associated with line 206, is 1 mm in length.

In each case, the squares are generated in isolation from other features in a layer of object generation. The three squares are each associated with an inverse-sigma curve showing temperature drop off with distance. The larger 25 mm square, which is formed using a relatively large quantity of energy absorbing fusing agent, is largely at a temperature of around 215° C., with a drop-off at its edges. The 3 mm square is largely at a temperature of around 207° C. The 1 mm square is largely at a temperature of around 197° C. This lower temperature is seen as the quantity of energy absorbing fusing agent is low. Assuming in this example the fusing temperature is 205° C., the 25 mm and 3 mm square would fuse, whereas the 1 mm square would not. In this example, therefore, features with dimensions of less than 2 mm may be considered to be 'at risk'.

However, it may be recalled that, in the example of FIG. 2, the features are isolated: if instead these features were relatively close to other build material to which fusing agent is applied, there may be heat transfer from that build material, and the temperature of the feature may be higher. Thus, while object features of less than 2 mm may be considered to be 'at risk' of failing to fuse, it may be the case that the risk is reduced or removed by nearby object portions.

Figure 3:
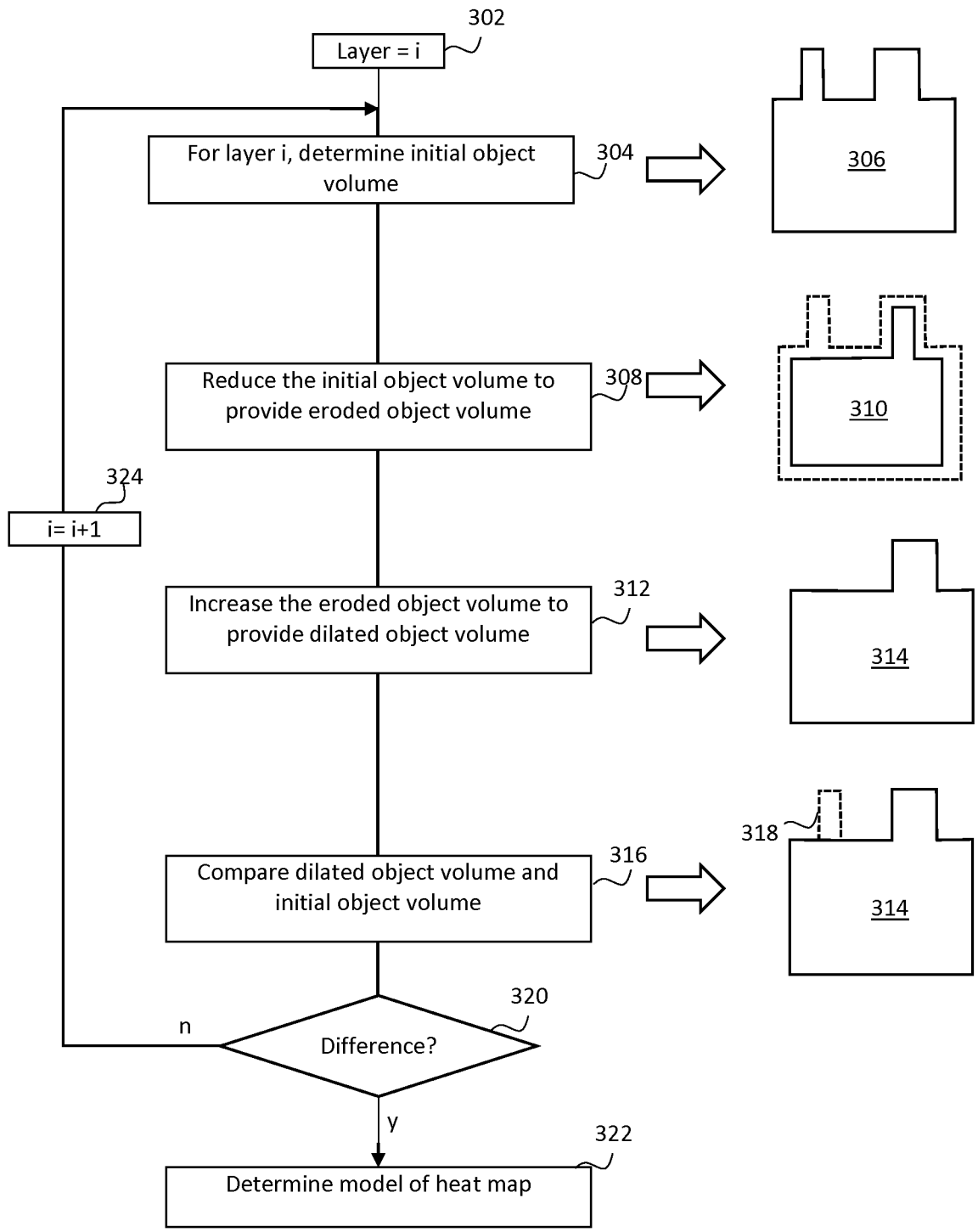
FIG. 3 is a flowchart of an example method of identifying features of less than a threshold size.

FIG. 3 is an example of a method of carrying out block 102 of FIG. 1. In this example the processing is carried on a layer by layer basis, and thus a portion of the object comprising a layer which may be generated according to the resolution of an additive manufacturing apparatus is analysed in one of plurality of cycles. However, in other examples, the object may be considered as a whole, or subdivided in some other way.

Block 302 comprise setting the layer to be a particular layer (which may for example be the first layer to be generated, but may be any layer). Block 304 comprises determining, for the layer, an initial object volume 306 (which is an example of a solid portion of an object layer) to be occupied by the object within that layer. For the sake of example, the initial object volume 306 in this case comprises a substantially square 'bulk' portion with a first oblong projecting feature having a width of 2 mm and a second oblong projecting feature having a width of 4 mm.

Block 308 comprises reducing the initial object volume 306 by a threshold amount in at least one spatial dimension to provide an eroded object volume 310. In this example, the initial object volume 306 is eroded in two spatial dimensions within the layer (i.e. the layer is treated as a two-dimensional plane). For example, if the layer comprises a slice along the Z axis in an XY plane, the object portion may be eroded in the X and Y dimensions. In other examples, if the object portion is associated with a depth (for example, a depth which varies across the object portion), it may be eroded in three dimensions. In this example the object portion is eroded by 1 mm in each of the X and Y dimensions. This example threshold amount may be determined on the basis that, for a particular combination of build material and print agents, features have dimensions greater than 2 mm are likely to reach a fusing temperature, whereas features smaller than that amount may be at risk of failing to fuse. In other examples, the threshold may differ, for example based on materials. In practical terms, in this example, eroding the initial object volume 306 comprises determining an inner perimeter which is 1 mm from any remaining edge. As the first projection has a width of 2 mm, it is eroded from both sides and is thus not represented in the eroded object volume 310. The second projection is eroded, but is still represented with a 2 mm width remaining.

Block 312 comprises increasing the eroded object volume 310 in the at least one spatial dimension by the threshold amount to provide a dilated object volume 314. As there is no trace of the first feature in the eroded object volume 310, it is not represented in the dilated object volume 314. The second projection is however restored. Block 316 comprises comparing the dilated object volume 314 to the initial object volume 306. In this example, there is a difference: the first projection, indicated in dotted line 318.

In some examples, any feature of an object/object portion which is present in the initial object volume 306 and absent in the dilated object volume 314 may be determined as being associated with a predicted object generation temperature which is below a fusing temperature of build material to be used in object generation.

In this example, if, in block 320, it is determined that there is a difference between the dilated object volume 314 and the initial object volume 306 the method continues in block 322 by determining a model of a heat map of a portion (in this example, a layer) of the object during object generation. If however it is determined in block 320 that there is no difference, the next layer is considered (block 324). Therefore, the erosion and dilation process of blocks 304, 308 and 312 may be carried out in order to determine potential features of interest, which may be analysed more closely by use of heat map. However, in some examples this close analysis may be avoided for object portions (for example, layers or parts of layers) without potential low-temperature features.

The effect of blocks 304, 308, 312 and 316 is to identify features of less than a threshold dimension as candidate features for heat mapping. In other examples, features of less than a threshold dimension may be determined in some other way. In some examples, such features may be assumed to be associated with temperatures below a fusing temperature, or may be further assessed using another thermal model.

In such examples, identifying a feature of the object as set out in block 104 may comprise identifying a region of a model (i.e. predicted) heat map which is below a threshold temperature. The method may then continue by setting the layer to be next layer and returning to block 304, for example until all layers (or more generally, portions) of the object have been considered.

Examples of two modelled heat maps are shown in FIG. 4, and may be generated based on modelled temperature distributions in build material which has been selectively treated with at least one print agent and to which energy (for example heat) has been applied. FIG. 4a is a heat map 400 of a first object layer 402 in which a higher temperature region 404 (which is indicative of temperatures above a fusing temperature) and a lower temperature region 406 (which is indicative of temperatures below a fusing temperature) is shown. For the sake of simplicity, the variability of temperatures within the regions 404, 406, is not shown but in practice, each of the regions may include build material which is predicated to be at a range of temperatures. The first object layer 402 comprises two relatively isolated features 408a, 408b, both of which are associated in part with the lower temperature, and a bulk portion 410, which is relatively large. FIG. 4b shows a heat map 412 of a second object layer 414. The second object layer 414 comprises a bulk portion 410, which in this example is the same as the first object layer 402, and features 416a-d which are similar in dimensions to the features 408a, 408b of the first object layer 402. However, the second object layer 414 differs from the first object layer 402 in that, in the example second object layer 414, the features 416a-d are relatively close together. Indeed, in this example the features 416a-d are sufficiently close that the features 416a-d are included within the higher temperature region 404 of the heat map. The object layers 402, 414 are surrounded by a region 418, which during object generation may be filled with unfused build material (and which may also vary in temperature across the region).

The modelled heat maps 400, 412 may therefore distinguish between those small features which will remain unfused, and those which will fuse, based on predicted temperatures.

In some examples, a heat map may be generated for part of a layer (or other object portion), for example for a portion of a layer comprising identified small feature(s) (for example identified by the method of blocks 304, 308 and 312 above). In an example, temperatures may be determined by calculating the predicted temperature of every pixel in a feature less than a threshold size using as inputs the temperature of the region 418 of unfused powder which surrounds the object layer 402, 414, and the temperature in other object portions, which may include object portions which are larger than a determined feature size, such as the bulk portions. In an example, the effect of a temperature of one pixel on other pixels is estimated using an inverse-sigma curve like the ones shown in FIG. 2.

In general, if features having dimension which are less than a threshold size are close to other features or object portions, they may successfully fuse without any modification despite their small size. However, if a feature is relatively isolated, it may remain unfused.

In other examples, a heat map may be generated for each layer without first identifying features of less than a threshold size.

FIG. 5 is an example of a method of determining modification data, in which the modification data comprises object model modification data. In block 502, initial modification data to increase a temperature of the feature in object generation is determined. This may for example be to increase the volume of the object in a locality of the feature. In this example, the initial modification data is to increase the volume of the feature itself, in an example by around 10-30% although it could be any other amount. In some examples, determining data to increase the temperature may comprise determining modification data to reduce the distance between the feature and at least one other solid object portion. In some examples, this may comprise increasing the size of at least one other object portion which is near to the feature. Such modifications may be combined. For example, if there is another feature which is relatively close to the feature of interest (such as a feature which is predicted not to reach a fusing temperature), both such features could be increased in size, for example while maintaining their relative proportions. Such a change may be have a minimal impact on the visual impression produced by an object, while increasing the volume of the material treated with a fusing agent in the locality of the feature, and therefore the temperature which the feature is likely to reach during object generation. In general, any modification of the material distribution within an object (which may be achieved by modifying a print agent distribution) which results in an increase in the temperature of the feature during object generation may be used. Such a modification may increase the volume of object material in the region of the feature (for example, such that a larger volume of build material within a layer is fused as a result of modifying the object model data with modification data).

The method further comprises, in block 504, modifying the object model data with the initial modification data (e.g. in an example, increasing the size of a feature by 20%) to generate modified object model data. Block 506 comprises analysing, using at least one processor, the modified object model data. For example, this analysing may as described in relation to block 102 above, or in relation to FIG. 3. Block 508 comprises determining, using at least one processor and from said analysing, if a feature generated according to the modified object model data is associated with a predicted object generation temperature which is below a fusing temperature of build material to be used in object generation. If so, block 510 comprises determining, using at least one processor, further modification data to be used in object generation, the further modification data being to increase the temperature of the feature during object generation. The further modification data may for example be to increase the volume of the object in a locality of the feature such that when, the object is generated, the temperature of the feature is increased. If however it is determined in block 508 that there is no remaining feature which may below the fusing temperature, in block 512, the method may terminate.

This method may therefore carry out object modifications iteratively, which may mean that the object is not unduly modified. In the example above, the feature was increased by 20%. In some example the increase in the volume size may for example be determined in the context of the object, for example such that object features remain distinct. In some examples, determining a modification to a print agent amount or type may be carried out iteratively.

In some examples, therefore, the modification data comprises object model modification data, the modification data being to increase the volume of the object in a locality of the feature such that when, the object is generated, the temperature of the feature exceeds the fusing temperature. In some examples, the modification data is to increase the size of the feature.

Figure 6:
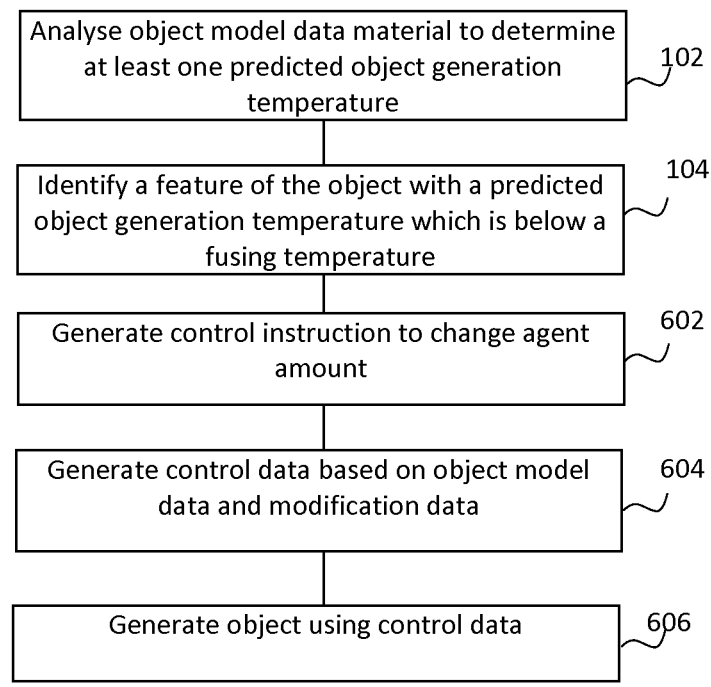
FIG. 6 is a flowchart of an example method of object generation.

FIG. 6 shows an example of a method for generating an object using additive manufacturing. Blocks 102 and 104 are carried out as described in the example above. In this example, generating modification data in block 106 comprises generating, in block 602, a control instruction to change an amount of print agent to be applied to build material to increase the energy absorption in a locality of the feature. This may comprise increasing an energy absorption characteristic of the materials used to form the object, for example increasing an energy absorption per unit volume.

Block 602 may for example comprise increasing energy absorption by increasing an amount (for example, an area coverage, or a contone level) of a fusing agent in a region of an identified feature. Increasing the amount of fusing agent on a small feature may increase the absorption of energy per unit volume from an energy source such as a heat lamp. In other examples, a different fusing agent, for example associated with a higher energy absorption may be used in place of an initial, or for example standard, agent. This agent may be applied over all or just part of the layer. It may for example be the case that a print agent which is not generally intended to be used based on an intended object characteristic may be selected for use in at least the region of a feature. This may for example result in a compromise in some other aspect of the object (such as strength, flexibility, cost of manufacture and the like) but in some examples, this may be acceptable if the feature is accurately generated as a result.

In some examples, block 602 comprises reducing (in some examples, to zero) a modifying agent, for example a detailing agent, in at least the location of the feature. Such agents can reduce the temperature of the build material during object generation, for example as they may be reflective, not absorb energy as well as fusing agents, or are evaporated, which has a cooling effect. In such examples, reducing such agents may increase the temperature during object generation to above a fusing temperature. This may for example result in a compromise in some other aspect of the object (such smoothness or finish) but in some examples, this may be acceptable if the feature is accurately generated as a result.

Block 604 comprises generating control data based on the object model data and the modification data. In block 606, this data is used, for example by an additive manufacturing apparatus, to generate an object.

Figure 7:
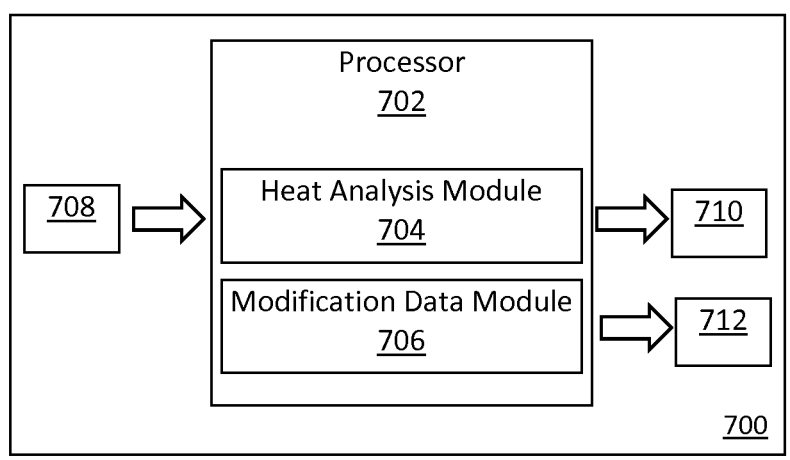
FIG. 7 is a simplified schematic drawing of an example of apparatus for processing data for additive manufacturing.

FIG. 7 shows an apparatus 700 comprising a processor 702. The processor 702 comprises a heat analysis module 704 and a modification data module 706. The heat analysis module 704 analyses object model data 708 representing an object to be generated by an additive manufacturing apparatus and generates temperature distribution model 710 (for example a heat map) modelling the predicted temperature distribution within the object during object generation. The heat analysis module 704 also identifies any feature of the object associated with a temperature which is below a fusing temperature of build material to be used in object generation.

The modification data module 706 determines modification data 712 indicative of a modification of at least one of the object model data and an object generation control parameter, the modification being determined such that the temperature of an identified feature is predicted to be at least the fusing temperature of build material to be used in object generation. An object generation control parameter may for example comprise at least one of which print agent(s) is/are to be applied; how much of the or each print agent is to be applied and/or the locations at which the or each print agent is to be applied.

In some examples, the modification data module 706 determines a modification which causes an increase in the object generation temperature of the feature which was identified by the heat analysis module 704 as being associated with a temperature which is below a fusing temperature of build material to be used in object generation.

Figure 8:
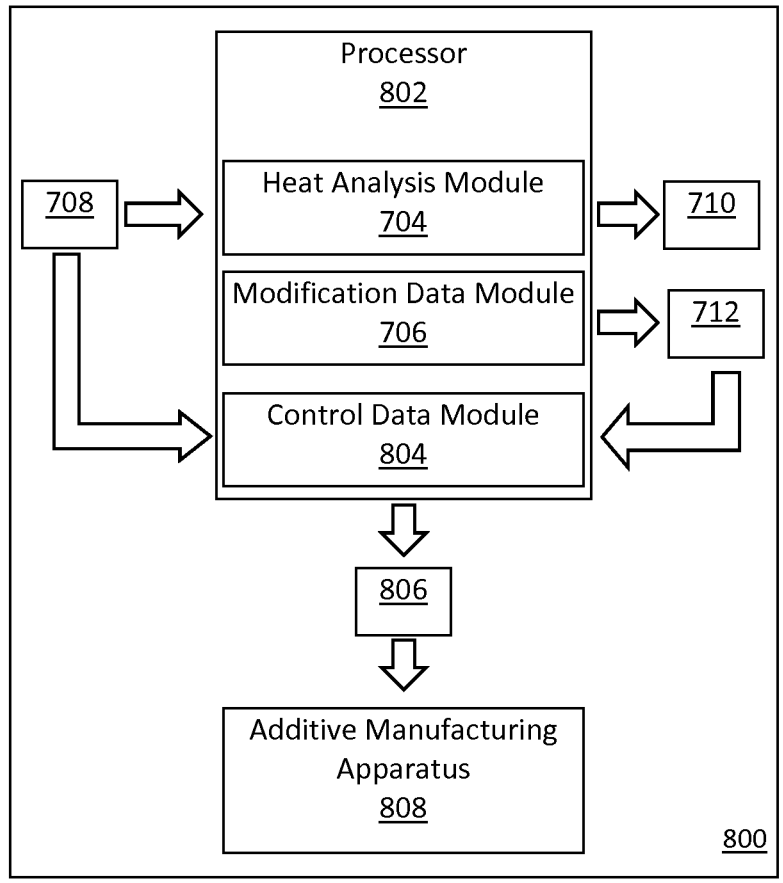
FIG. 8 is a simplified schematic drawing of an example apparatus for additive manufacturing.

FIG. 8 shows an apparatus 800 comprising a processor 802, the processor 802 comprising a heat analysis module 704 and a modification data module 706 as described in relation to FIG. 7. In this example the processor 802 further comprises a control data module 804 to generate control data 806 using the object model data 708 and the modification data 712. For example, the modification data 712 may be used to modify the object model data 708, and the modified object model data may be used to generate the control data 806, and/or the modification data 712 may be used to modify the control data 806 with regard to the placement of a print agent type or amount during object generation.

The apparatus 800 further comprises additive manufacturing apparatus 808 which generates an object according to the control data 806. The additive manufacturing apparatus 808 may for example generate an object in layer-wise manner by selectively solidifying portions of layers of build materials. The selective solidification may in some examples be achieved by selectively applying print agents, for example through use of 'inkjet' liquid distribution technologies, and applying energy, for example heat, to the layer.

Figure 9:
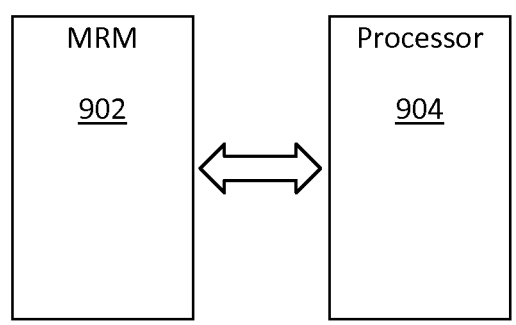
FIG. 9 is a simplified schematic drawing of an example machine readable medium associated with a processor.

FIG. 9 shows a machine readable medium 902 associated with a processor 904. The machine readable medium 902 comprise instructions which, when executed by the processor 904, cause the processor 904 to analyse object model data representing an object to be generated by an additive manufacturing apparatus; generate a model of a temperature distribution within the object during object generation, and to identify if any feature of the object is associated with a modelled temperature which is below a fusing temperature of build material to be used in object generation; and to determine modification data, the modification data being to enhance fusion of the feature in object generation by modifying at least one of: a material distribution within the object to be generated and an energy absorption characteristic of the object in object generation. An energy absorption characteristic may for example indicate how much energy is absorbed per unit area or volume. This may for example be modified by increasing an amount of a print agent which tends to enhance energy absorption, and/or by decreasing an amount of a print agent which tends to reduce energy absorption.

In examples, the machine readable medium 902 may comprise instructions to carry out any, or any combination, of the blocks of FIG. 1, 3, 5 or 6.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus (such as the heat analysis module 704, modification data module 706 and control data module 804) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
analysing, using at least one processor, object model data representing at least a portion of an object to be generated by an additive manufacturing apparatus by fusing build material to determine at least one predicted object generation temperature;
identifying, using at least one processor and from said analysing, a feature of the at least a portion of the object associated with a predicted object generation temperature which is below a fusing temperature of build material to be used in object generation;
determining, using at least one processor, modification data which comprises object model modification data, the modification data to increase a volume and size of the object in a locality of the feature by causing an increase in energy absorption in the locality of the feature during object generation which increases a temperature of the feature in object generation; and,
using the modification data to control an additive manufacturing apparatus to change an amount of print agent applied to build material in a locality of the feature during object generation thereby altering the energy absorption and temperature of the feature during object generation.

2. The method of claim 1 in which analysing the object model data comprises identifying at least one feature of the at least a portion of the object having at least one dimension which is below a threshold size; and
when a feature having at least one dimension which is below a threshold size is identified, determining at least one predicted object generation temperature for a region of the object including the feature.

3. The method of claim 1 in which analysing the object model data comprises:
determining, for at least a portion of the object, an initial object volume to be occupied by the object or object portion;
reducing the initial object volume by a threshold amount in at least one spatial dimension to provide an eroded object volume;
increasing the eroded object volume in the at least one spatial dimension by the threshold amount to provide a dilated object volume; and
comparing the dilated object volume to the initial object volume.

4. The method of claim 1 in which analysing the object model data comprises determining a model of a heat map for at least a portion of the object during object generation;
and in which identifying a feature of the object which is associated with a predicted object generation temperature below a fusing temperature of build material to be used in object generation comprises identifying a region of the heat map which is below a threshold temperature.

5. The method of claim 1 in which the modification data comprises object model modification data, the method further comprising:
determining initial modification data to increase a temperature of the feature in object generation;
modifying the object model data with the initial modification data to generate modified object model data;
analysing, using at least one processor, the modified object model data; and
determining, using at least one processor and from said analysing, if a feature generated according to the modified object model data is associated with a predicted object generation temperature which is below a fusing temperature of build material to be used in object generation, if so, determining, using at least one processor, further modification data to be used in object generation, the further modification data being to increase the temperature of the feature during object generation.

6. The method of claim 1 wherein to change an amount of print agent applied to build material comprises to change a type of print agent applied to build material.

7. The method of claim 1 wherein using the modification data comprises generating control data based on the object model data and the modification data.

8. The method of claim 7 further comprising generating an object using the control data in the additive manufacturing apparatus.

9. Apparatus comprising at least one processor, the at least one processor comprising:
- a heat analysis module comprising instructions stored in a tangible memory and executable by a processor to analyse object model data representing an object to be generated by an additive manufacturing apparatus, to generate a temperature distribution model indicative of a predicted temperature distribution within the object during object generation, and to identify any feature of the object associated with a predicted temperature which is below a fusing temperature of build material to be used in object generation; and
- a modification data module comprising instructions stored in a tangible memory and executable by a processor to determine modification data which comprises object model modification data, the modification data to increase a volume and size of the object in a locality of the feature by causing an increase in energy absorption in the locality of the feature during object generation which increases a temperature of the feature in object generation, wherein the modification data is indicative of a modification of at least one of the object model data and an object generation control parameter, the modification data being determined such that a temperature of the identified feature is predicted to be at least the fusing temperature of build material to be used in object generation, and the object generation control parameter to control an additive manufacturing apparatus to change an amount of print agent applied to build material in a locality of the identified feature during object generation thereby altering the energy absorption and temperature of the feature during object generation.

10. Apparatus according to claim 9 further comprising a control data module to generate control data using the object model data and the modification data.

11. Apparatus according to claim 10 further comprising additive manufacturing apparatus to generate an object according to the control data.

12. A non-transitory machine readable medium comprising instructions which, when executed by a processor, cause the processor to:
- analyse object model data representing an object to be generated by an additive manufacturing apparatus;
- generate a model of a temperature distribution within the object during object generation;
- identify if any feature of the object is associated with a temperature which is below a fusing temperature of build material to be used in object generation;
- determine modification data, the modification data comprising object model modification data, the modification data to increase a volume and size of the object in a locality of the feature by causing an increase in energy absorption in the locality of the feature during object generation which increases a temperature of the feature in object generation and,
- control an additive manufacturing apparatus to change an amount of print agent applied to build material in a locality of the feature during object generation thereby altering the energy absorption and temperature of the feature during object generation.

* * * * *